Sept. 1, 1942.                R. R. CURTIS ET AL                    2,294,386
                                 AIRCRAFT AIR PUMP
                              Filed Feb. 29, 1940          2 Sheets-Sheet 1

INVENTORS.
Russell R. Curtis
and Theodore R. Thoren
BY Frederick W. Cotterman
ATTORNEY.

Sept. 1, 1942.  R. R. CURTIS ET AL  2,294,386
AIRCRAFT AIR PUMP
Filed Feb. 29, 1940  2 Sheets-Sheet 2
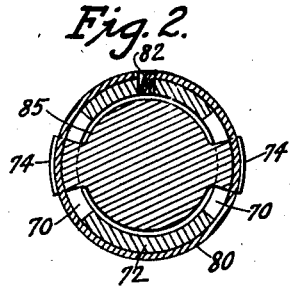
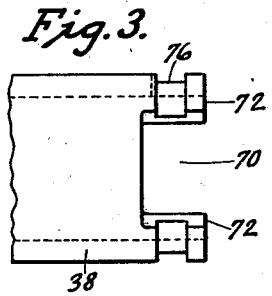
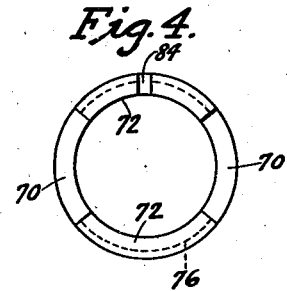
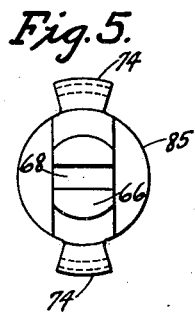
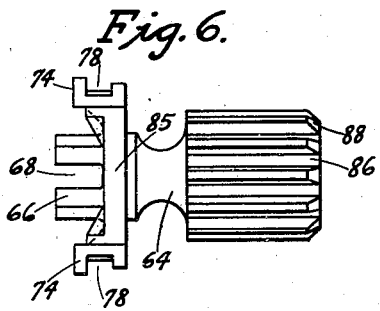
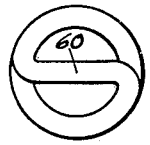
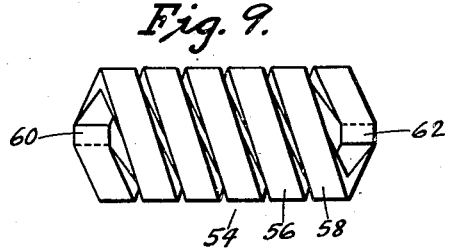
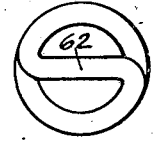
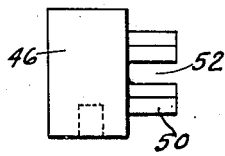
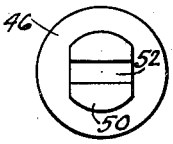
INVENTORS
Russell R. Curtis
and Theodore R. Thoren
BY Frederick W. Cotterman
ATTORNEY.

Patented Sept. 1, 1942

2,294,386

UNITED STATES PATENT OFFICE 2,294,386

AIRCRAFT AIR PUMP

Russell R. Curtis, Dayton, and Theodore R. Thoren, Bedford, Ohio, assignors to Curtis Pump Company, Dayton, Ohio, a corporation of Ohio Application February 29, 1940, Serial No. 321,494

7 Claims. (Cl. 64—15)

This invention relates to air pumps and has special reference to air pumps for aircraft. Most modern aircraft employ a pump, usually of the rotary sliding vane type to provide air under pressure for operating de-icing equipment, and air under vacuum for operating flight instruments, etc.

One of the main considerations in the design of aircraft engines is lightness and therefore aircraft engineers prefer to employ no flywheel to smooth out the separate impulses in the cylinders, depending rather on the propeller for such flywheel effect as it may have. The result is that the engine crankshaft is subject to slight change in angular velocity at as many points in a single revolution as there are impulses, this effect being commonly referred to as torsional whip. Variation in the intensity of the several impulses or defective firing in a cylinder may at times considerably intensify this torsional whip.

Due to the same necessity for lightness as well as to space limitations, engine driven acessories are made as small and light as possible and then often loaded to near their maximum capacity. A heavily loaded pump, for instance, when driven by an engine having considerable torsional whip, puts a severe strain on the drive which connects the pump and engine, and it follows that any drive which absorbs some or all of this torsional whip will be highly advantageous to the assembly.

When a pump is to be mounted on an aircraft engine and driven directly from one of its shafts, slight misalignment of the engine and pump shafts will inevitably be present and it is therefore essential that some sort of universal joint means or its equivalent be embodied in the drive.

Since the selected engine shaft from which the pump must be driven may rotate oppositely in different makes of engines, it is essential that the pump and its drive will operate equally well in either direction of rotation.

It is therefore an object of this invention to provide a pump with a drive, so constructed and arranged, that it will absorb the torsional whip of the engine, allow for considerable misalignment between the engine and pump shafts, and operate with equal facility in either direction of rotation, all with a minimum number of easily renewed parts of maximum strength and endurance, light weight and low cost and absorbing a minimum of space in the assembly.

Since any power pump having rotatable elements necessarily has a rotatable shaft extending, to which the driving force is applied, there should preferably be provided a seal to prevent leakage from the pump along the outside of the shaft, and since conservation of space is important, it is another object of the invention to conserve space by making the shaft hollow, then placing the drive within the shaft and the seal without the shaft, within the same axial dimensions.

A rotary pump of the sliding vane type when employed under the extreme load conditions imposed in aircraft service requires lubrication which is not only continuous but substantially perfect, for while sufficient lubricant should pass continuously thru the pump an excess amount of lubricant is undesirable.

It is therefore another object of the invention to provide a metering system for admitting lubricant to the pump under pressure and in a carefully measured amount during the entire time that the pump is under rotation, the metering system being so combined with the seal as to require no extra space in the structure.

Another object is to provide a pump structure having means whereby it is quickly and easily disassembled into its several parts so that renewal parts may be quickly substituted and repairs readily made.

These and other objects and advantages will become more clearly apparent from the following detailed description, reference being made to the drawings, wherein, Fig. 1 is an axial section thru a rotary pump embodying the principles of the invention.

Fig. 2 is a transverse section taken at 2—2 of Fig. 1 showing the means for retaining the driving shank in place.

Fig. 3 is a fragmentary side view of the outer end of the hollow rotor shaft.

Fig. 4 is an end view of the shaft shown in Fig. 3.

Fig. 5 is a left hand end view of the driving shank.

Fig. 6 is a side view of the driving shank.

Fig. 7 is a right hand end view of the driving shank.

Fig. 8 is a left hand end view of the driving spring.

Fig. 9 is a side view of the driving spring.

Fig. 10 is a right hand end view of the driving spring.

Fig. 11 is a side view of the driving plug.

Fig. 12 is a right hand end view of the driving plug.

Like numerals refer to like parts thruout the several views of the drawings.

Figure 1:
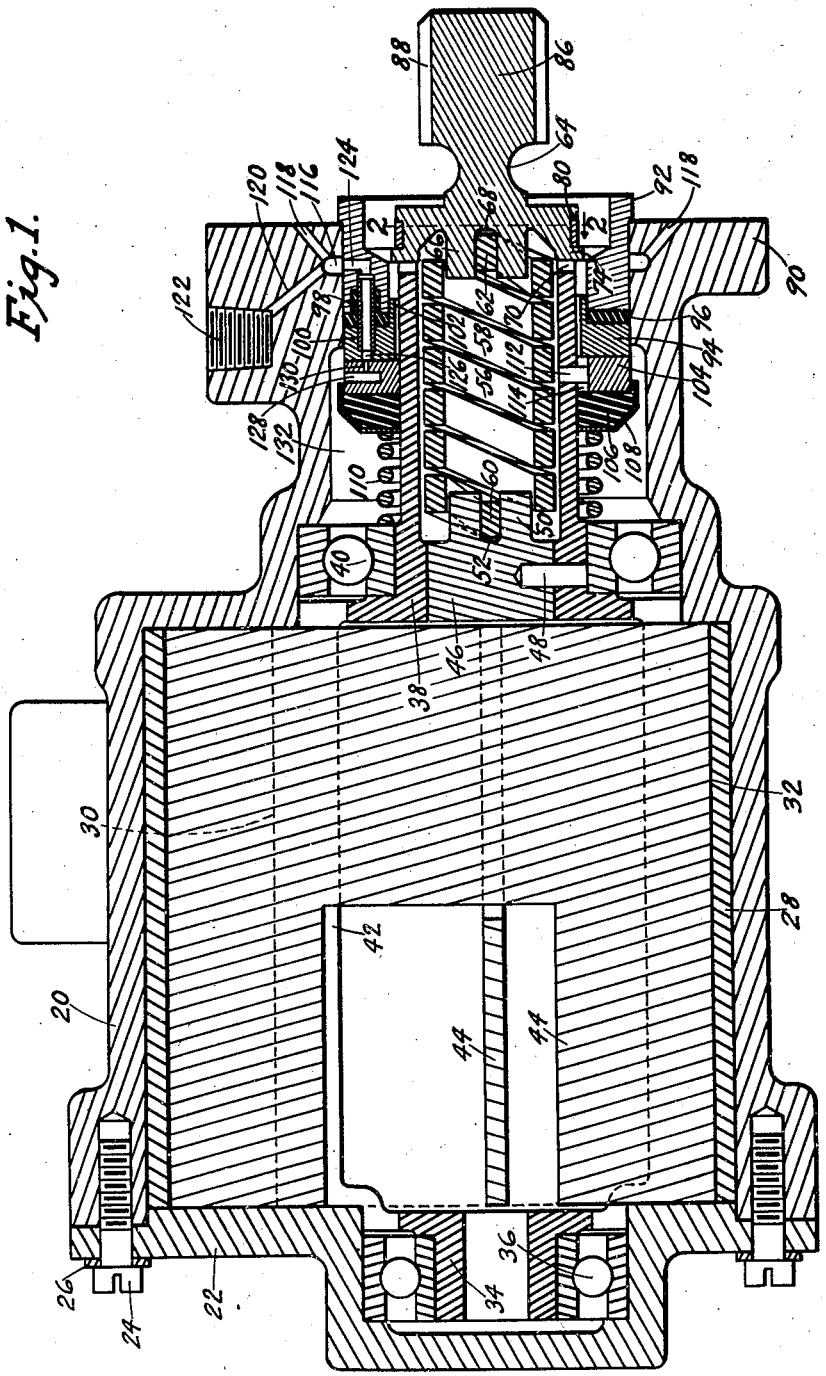

The pump selected as an illustrative embodiment of the invention comprises a housing 20 having a head 22 secured thereto by screws 24 and lock washers 26. The head 22 supports one of the rotor bearings and provides a pressure tight closure for the end of the casing.

A liner 28 is press fitted in the casing and has port openings extending thru it which communicate with suction and discharge ports in the casing, but since the design of the ports has no bearing on this invention they are omitted from the drawings.

The rotor body 30 has its axis offset with respect to the liner 28 so that the rotor body touches the liner on one side, as at 32, as is usual in pumps of this type. A hollow stub shaft 34, an integral part of the rotor body 30, carries the bearing 36 which is supported in the head 22. A longer hollow drive shaft 38, also an integral part of the rotor body, carries the bearing 40 supported in the housing 20.

The rotor body 30 has four circumferentially equally spaced slots 42 into which two thru vanes 44 are slidably fitted. The two vanes are alike, one being turned end for end with respect to the other and positioned ninety degrees rotation therefrom. The type of vane and their number is selected for illustrative purposes only and is not intended as a structural limitation of the invention.

Press fitted into the hollow of the rotor driving shaft 38 is the driving plug 46 further secured against rotation in the shaft by the pin 48. An integral driving hub 50 on the plug is of reduced diameter and provided with a transverse driving slot 52 (see Figs. 11 and 12).

A driving spring 54, shown in detail in Figs. 8, 9 and 10, comprises, in a single piece, an endless loop formed into the shape of a double coiled helical spring wherein one coil 56 lies beyond the other coil 58, the coils being joined together at both ends to compose driving portions 60 and 62 passing from the outside of one coil to the outside of the other thru their common axis.

A driving shank 64 (see Figs. 5, 6 and 7), has a hub 66, substantially like the hub 50 of the driving plug 46, and having a like transverse slot 68. The driving portions 60 and 62 of the spring lie in the slots 52 and 66 and should be fitted to the slots closely.

The outer end of the hollow rotor shaft 38 (see Figs. 2, 3 and 4) is notched as at 70 to provide the overload driving jaws 72. The driving shank 64 has overload driving lugs 74 which are normally located circumferentially midway in the notches 70 (see Fig. 2). When the pump is being driven thru the spring 54, the spring yields slightly and the lugs 74 move slightly closer to one or the other of the edges of the jaws 72. It is, however, only under extreme overload conditions that the torsional deflection of the spring is sufficient to allow the lugs 74 to engage the jaws 72 in driving relation.

Arcuate grooves 76 and 78 extend around the jaws 72 and lugs 74 respectively, and a snap ring 80 is sprung into these grooves to hold the shank and shaft in assembled relation. The ring 80 is preferably fitted quite loosely in the grooves to allow slight misalignment of the respective axes of the shaft and shank.

One end of the ring 80 is bent over as at 82, (see Fig. 2) the bent over end extending into an appropriate notch 84 (see Fig. 4), in the shaft, thereby compelling unitary rotation of the ring and shaft and maintaining the shaft in the ring intermediate the notches 70. A round portion 85 of the driving shank 64 is made sufficiently smaller than the hole in the shaft 38 to fix the maximum misalignment of the shaft and shank at a predetermined value.

The outer end 86 of the shank 64 is provided with external splines 88 adapted to fit slidably into a corresponding internally splined opening in the end of the engine shaft. The flange 90 of the body 20 may be bolted or similarly secured to a mounting pad on the engine.

The means provided for sealing against leakage from the drive end of the pump comprises several non-rotative and several rotative members. The metal seal cap 92 is press fitted to the body 20, a metal ring 94 fits the body 20 freely, and a synthetic rubber washer 96 is interposed between the two parts to seal against leakage which might occur around the outside of ring 94, between parts 94 and 92 and then thru the inside of cap 92.

The cap 92 is counterbored to receive the small hub 98 which is molded as an integral part of the rubber washer 96. The ring 94 is counterbored for the small tube 100 which is press fitted in the ring and extends first tightly thru the hub 98 then slidably into a hole in the cap 92.

The ring 94 is therefore held non rotative by the tube 100, and since the ring fits into the body 20 more closely than it does around the shaft 38, there is no possibility of the ring swinging with the tube 100 as an axis and dragging on the rotating shaft 38.

Since synthetic rubber is subject to swelling under the action of oil and subject to flow under heavy pressure, a piloting end 102 extends from the ring 94 thru and beyond the inner diameter of the rubber washer 96 to confine it to its allotted space.

The rotatable members of the sealing means comprise a metal ring 104, a synthetic rubber ring 106, a cup 108 and a spring 110. The metal ring 104 is compelled to rotate with the shaft 38 by a pin 112, one end of which is press fitted into a hole in the shaft and the other end slidable in a keyway 114 in the ring. The rubber ring 106 fits over the shaft 38 closely and is confined to normal dimensions by the cup 108, the open side of which extends over the ring 104 but should not fit it too closely. The spring 110 abuts the inner member of the bearing 40, its expansive force acting against the cup 108 whereby a seal is made between the rubber ring 106 and shaft 38 and between the rubber ring and the metal ring 104, all of these parts rotating at the same speed.

The rotatable metal ring 104, being movable axially, is therefore resiliently held in contact with the non rotatable metal ring 94 and it is important that their contacting faces each be finished to a mirror like surface to maintain a perfect seal under relative rotation.

Seals of this class, as customarily constructed, would have the non rotative ring 94 press fitted directly into the casing 20 and would, of course, thereby eliminate the ring 96 by combining the ring 94 and cap 92 as one part.

Where, however, the non rotative ring is press fitted into the casing, there is substantially always slight distortion of the press fitted ring, which, altho practically unmeasurable, nevertheless manifests itself by slight leakage at the joint. The usual procedure is then to lap the rings 104 and 94 together in place by rotation of the ring 104 against the ring 94 with an abrasive lapping compound therebetween. This procedure produces circular scratches which altho minute can never be wholly eliminated by circular lapping.

Inasmuch as, the efficacy of the seal is in proportion to the perfection of the contacting surfaces of rotatable ring 104 with non rotatable ring 94, these surfaces, in the embodiment herein shown, are ground, lapped and honed to perfect mirror like planes separately and before assembly, and are not thereafter lapped one on the other by rotative movement therebetween, but are instead lapped according to the well known process of producing perfect plane surfaces which comprises movement of the part being lapped in constantly varying direction with respect to the plane surface lap.

Since, in the assembly, the rings 104 and 94 are resiliently held, neither being fitted closely to any other part so as to be distorted, it follows that the seal thus produced is substantially perfect under rotation.

In order to cause several of the seal members above described, to function also as a metering means for the pump lubricant, the end of the casing 20 is provided internally with an annular groove 116 to which oil under pressure is brought thru one of the small holes 118 or 120. The hole 120 communicates with a tapped opening 122 adapted for connection with the main oil pressure system of the engine by suitable piping, while the hole 118 is positioned to meet a corresponding hole in the mounting pad of the engine, the hole in the pad communicating with a chamber in the engine which contains oil under pressure. A series of additional holes 118 are preferably provided so that the pump may be mounted inverted, or, turned ninety degrees either direction on its axis and in either case have a hole 118 meet the hole in the engine mounting pad. The press fit of the cap 92 into the body 20 closes the inside of the groove 116 and converts it into a pressure tight annular channel.

A small passageway 124 in cap 92 connects the annular channel 116 to the end of the tube 100, the passage way from the other end of the tube being prolonged by a hole 126 which extends from the end of the tube to the joint between the non rotative ring 94 and the rotatable ring 104.

A radial opening 128 in the rotatable ring 104 is connected by a tiny metering hole 130 to the contacting surfaces between rings 104 and 94.

It will now be evident that there is only one joint in the sealing means where there is relative rotation, and that there is a continuous supply of oil under pressure conveyed to this joint from channel 116 thru tube 100 and hole 126, and that while the end of the hole 126 is kept closed by the rotating surface of ring 104 for the greater portion of each revolution, a passage way for oil is nevertheless completed during about 2⅓% of each revolution thru the metering hole 130 and radial hole 128 to the space 132 from which it finds its way thru the bearing 40 to the blades 44 and rear bearing 38.

The hole 126 is made enough larger than the tiny metering hole 130, that should slight variance in the relative radial positioning of the two holes result from inaccuracies in manufacture, the percentage of time the oil passage is completed, and consequently the amount of oil metered will not be seriously affected.

The advantage of the resilient whip absorbing universal drive will be obvious. When the device is inactive, the lugs 74 of the drive shank 64 will be midway in the notches 70 (see Fig. 2) and when under normal load only slightly off the position shown one way or the other depending on the direction of rotation. Under extreme overload condition, however, such as might injure the driving spring 54 if much further increased, the lugs 74 of the drive shank will make contact with the jaws 72 of the rotor shaft and there will thenceforth be a positive drive as long as such overload conditions prevail.

When the device is once assembled as shown in Fig. 1, the entire rotor, drive and seal, with the exception of the cap 92 may be withdrawn from the casing 20 by merely removing the head 22, whereby worn or damaged parts may be readily replaced or repaired.

Having described an embodiment of our invention in which the objects hereinbefore set forth are achieved, we claim:

1. A drive comprising a part to be driven having an axially extending opening therein, a diametrically slotted hub smaller than said opening and having an end portion fixed within the opening, a second diametrically slotted hub at the outer end of the opening, the hubs being axially spaced apart and the slots facing each other, a driving shank comprising a prolongation on the second said hub adapted for connection to a power source, a closed loop formed into a double coil spring wherein the turns of one coil are between the turns of the other and wherein integral diametrically extending driving ends connect the ends of the coils one to the other, said coils fitting loosely in said hollow and freely over said hubs, and said driving ends fitting snugly in said slots, positive drive lugs extending radially from said shank into notches in said part, said lugs being circumferentially narrower than said notches and normally positioned midway therein, an annular groove partly in said driven part and partly in said lugs and a spring snap ring in said groove.

2. A whip absorbing drive comprising an elongated hollow member having peripheral notches at one end, a closure for the other end having a transverse driving slot opening toward the notched end of said hollow member, and endless coil spring within said hollow member having looped ends one of which is seated within said driving slot, and a driving shank having a slotted portion for receiving the other looped end of said spring and adapted for connection to a power source, lugs on said shank extending into the notches in the end of said hollow member, said lugs being adapted to engage the notched end of said hollow member for positive drive when said spring has yielded to applied torque a predetermined degree in either direction.

3. In a driving mechanism, a hollow member having peripheral notches at one end defining axially extending lugs, said lugs having aligned peripheral grooves and one of said lugs having a radial slot, a hub member having peripheral lugs at one end of less width than said notches, the lugs on said hollow member having aligned peripheral grooves, and a snap ring for seating in all the grooves in said lugs when the latter are positioned in interengagement, said snap ring having an inturned end for insertion into the radial slot in said one lug on the hollow member for maintaining said lugs in interengagement.

4. A driving mechanism comprising a hollow rotatable part, a driven member fixed within the hollow of said part and having a transversely slotted reduced hub portion, a driving member at one end of said hollow part having a transversely slotted reduced hub portion within the hollow and facing said first slotted hub portion, said driving member having a driving shank and a radial flange between the driving shank and the end of the slotted hub portion, spaced axially extending interfitting means on said radial flange and said one end of the hollow part providing a positive drive between said driving member and said hollow part when said means are in interengagement, and an endless coil spring within said hollow part having its end coils connected to form driving portions, said end coils embracing said reduced hub portions and the driving portions of said spring being seated within the slots of said hub portions providing a yielding drive therebetween when said interfitting means are in spaced relation.

5. A driving mechanism comprising a hollow rotatable part, two axially spaced hubs within the hollow having transverse slots facing each other, one hub being secured within said hollow part to rotate therewith and the other hub having a radially extending portion adjacent the slotted end thereof, a double coil spring fitting loosely within said hollow and over said slotted hubs and having end portions fitting snugly in said slots, spaced interfitting lug means on an end of said rotataole part and on said radially extending portion, aligned slots in said interfitting lug means, and ring means in said aligned slots for limiting relative endwise movements of said other hub with respect to said hollow part.

6. A driving mechanism comprising a driving member, a torsion spring driven by said driving member, a hollow member housing said spring and being driven thereby, circumferentially spaced interfitting lug means formed as longitudinal extensions on adjacent end portions of said driving member and said driven hollow member and spaced radially outward of said spring, said lug means being adapted to thrust against each other upon overloading of the torsion spring to directly couple said driving member and said driven hollow member together, and means independent of said spring for limiting relatve endwise movements between said driving member and said driven hollow member.

7. A driving mechanism comprising a hollow rotatable member, a driven member fixed within the hollow of said rotatable member and having a transversely slotted hub portion, a driving member at one end of said hollow rotatable member having a transversely slotted hub portion within the hollow and facing the slotted hub on said driven member, said driving member having a driving shank and a radial flange between the shank and the slotted hub thereon, spaced interfitting lug means formed as longitudinal extensions on said radial flange and said one end of the hollow rotatable member providing a positive drive between said driving member and said hollow rotatable member when said lug means are in interengagement, and a torsion spring within said hollow rotatable member having the ends thereof formed to seat in the slotted hub portions of said driving and driven members providing a yieldable drive therebetween when said interfitting lug means are in spaced relation, and means for limiting relative endwise movements between said hollow rotatable member and said driving member.

RUSSELL R. CURTIS.
THEODORE R. THOREN.